United States Patent
Bryant et al.

(10) Patent No.: US 9,774,365 B2
(45) Date of Patent: Sep. 26, 2017

(54) TRANSCEIVER FRONT-END

(71) Applicant: Telefonaktiebolaget L M Ericsson (publ), Stockholm (SE)

(72) Inventors: Carl Bryant, Lund (SE); Jonas Lindstrand, Lund (SE); Henrik Sjoland, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 25 days.

(21) Appl. No.: 14/646,868

(22) PCT Filed: Nov. 22, 2012

(86) PCT No.: PCT/EP2012/073390
§ 371 (c)(1),
(2) Date: May 22, 2015

(87) PCT Pub. No.: WO2014/079501
PCT Pub. Date: May 30, 2014

(65) Prior Publication Data
US 2015/0270864 A1    Sep. 24, 2015

(51) Int. Cl.
*H04B 1/525* (2015.01)
*H04L 5/14* (2006.01)

(52) U.S. Cl.
CPC .............. *H04B 1/525* (2013.01); *H04L 5/14* (2013.01)

(58) Field of Classification Search
CPC .......... H04B 1/581; H04B 1/525; H04B 1/18; H03H 7/42; H03H 7/38; H03H 7/48; H04L 5/14
See application file for complete search history.

(56) References Cited

U.S. PATENT DOCUMENTS 6,169,912 B1 *  1/2001  Zuckerman ............ H04B 1/525
                                                      455/570
7,599,675 B2 * 10/2009  Mu ....................... H03D 7/1441
                                                      375/345
(Continued)

FOREIGN PATENT DOCUMENTS

SE    WO 2009106515 A1 *  9/2009  ............. H04B 1/123
WO   WO 2006029238 A1 *  3/2006  ............. H03H 7/38
(Continued)

OTHER PUBLICATIONS

ISSCC 2009 / Session 22 / PA and Antenna Interface / 22.7, titled A Tunable Integrated Duplexer with 50dB Isolation in 40nm CMOS was published as Solid-State Circuits Conference—Digest of Technical Papers, 2009. ISSCC 2009. IEEE International, IEEE, Piscataway, NJ, USA, Feb. 8, 2009 (Feb. 8, 2009), pp. 386-387,387a,ISBN: 978-1-4244-3458-9.*

(Continued)

*Primary Examiner* — Andrew Lai
*Assistant Examiner* — Hoyet H Andrews, III
(74) *Attorney, Agent, or Firm* — Leffler Intellectual Property Law, PLLC (57) ABSTRACT

A transceiver front-end for a communication device is connectable at a signal transmission and reception arrangement node to a signal transmission and reception arrangement adapted to transmit a transmit signal having a transmit frequency and to receive a receive signal having a receive frequency. The transceiver front-end is also connectable at a transmitter node to a transmitter adapted to produce the transmit signal and at a receiver node to a receiver adapted to process the receive signal. The transceiver front-end comprises a transformer, wherein the transmitter node is connected to a first node of a first side of the transformer, the receiver node is connected to a first node of a second side of the transformer, and the signal transmission and reception (Continued)

arrangement node is connected to a second node of the first side of the transformer and to a second node of the second side of the transformer. The transceiver front-end also comprises a first tunable capacitance connected between the transmitter node and the receiver node, and a second tunable capacitance connected between the signal transmission and reception arrangement node and a signal reference level. Corresponding transceiver, communication device and method are also disclosed.

15 Claims, 2 Drawing Sheets

(56) References Cited

U.S. PATENT DOCUMENTS

| | | | | |
|---|---|---|---|---|
| 7,809,517 | B1* | 10/2010 | Zuckerman | G01R 31/31709 324/537 |
| 8,064,847 | B2* | 11/2011 | Backes | H04B 1/48 455/78 |
| 2004/0151302 | A1* | 8/2004 | Sabouri | H03H 7/48 379/390.04 |
| 2008/0242235 | A1* | 10/2008 | Adler | H04B 1/006 455/73 |
| 2010/0035563 | A1* | 2/2010 | Mikhemar | H04B 1/40 455/78 |
| 2011/0064004 | A1* | 3/2011 | Mikhemar | H04B 1/18 370/277 |
| 2011/0250852 | A1* | 10/2011 | Greene | H03H 7/40 455/73 |
| 2011/0281527 | A1* | 11/2011 | Chiang | H04B 1/18 455/73 |

FOREIGN PATENT DOCUMENTS

| | | | |
|---|---|---|---|
| WO | WO 2010120938 A2 * | 10/2010 | H03F 1/565 |
| WO | WO 2012106308 A1 * | 8/2012 | H04B 1/525 |

OTHER PUBLICATIONS

ISSCC 2009 / Session 22 / PA and Antenna Interface / 22.7, titled A Tunable Integrated Duplexer with 50dB Isolation in 40nm CMOS was published as Solid-State Circuits Conference—Digest of Technical Papers, 2009. ISSCC 2009. IEEE International, IEEE, Piscataway, NJ, USA, Feb. 8, 2009 (Feb. 8, 2009), pp. 386-387,387a,XP031742309, ISBN:978-1-42.*

PCT International Search Report, mailed Sep. 20, 2013, in connection with International Application No. PCT/EP2012/073390, all pages.

PCT Written Opinion, mailed Sep. 20, 2012, in connection with International Application No. PCT/EP2012/073390, all pages.

Mikhemar, M. et al. "A tunable integrated duplexer with 50 dB isolation in 40nm CMOS" 2009 IEEE International Conference on Solid-State Circuits, Feb. 8, 2009, pp. 386-387, 387a, XP031742309, ISBN: 978-1-4244-3458-9.

Mikhemar, M. et al. "An on-chip wideband and low-loss duplexer for 3G/4G CMOS radios" 2010 IEEE Symposium on VLSI Circuits (VLSIC), Jun. 16-18, 2010, Honolulu, HI, pp. 129-130, ISBN: 978-1-4244-5454-9.

Williamson, M. et al. "Performance Analysis of Adaptive Wideband Duplexer" Australian Telecommunications Networks and Applications Conference, 2003, pp. 1-5.

Gan, H. Dissertation "On-chip Transformer Modeling, Characterization, and Applications in Power and Low Noise Amplifiers" Stanford University, Mar. 2006, pp. 1-120.

PCT International Preliminary Report on Patentability, issued May 26, 2015, in connection with International Application No. PCT/EP2012/073390, all pages.

* cited by examiner

TRANSCEIVER FRONT-END

TECHNICAL FIELD

The present invention relates generally to the field of transceiver front-ends for communication devices. More particularly, it relates to transceiver front-ends providing isolation between a transmitter and a receiver.

BACKGROUND

In transceivers for frequency division duplex (FDD) communication (e.g. a transceiver of a cellular radio equipment), the receiver typically experiences strong interference signals from the transmitter of the same transceiver.

The interference signal from the transmitter has a carrier frequency at duplex distance from the carrier frequency of the receive signal. A typical duplex distance is small compared to the carrier frequencies. Typically, the duplex distance may be less than 100 MHz while the carrier frequencies may, for example, be somewhere between 700 MHz and 3 GHz.

To be able to operate with required performance (e.g. achieving good sensitivity), the receiver should preferably be shielded (or isolated) from the interference from the transmitter of the transceiver, both from transmitter signals at transmit frequency and transmitter generated interference at receive frequency. It is also desirable that the transmitter is shielded (or isolated) from the received signals. Example reasons include that as much of the received energy as possible should be transferred to the receiver for optimal receiver performance and that received signals occurring at the transmitter output may cause interference to the signal to be transmitted.

Such isolation is typically achieved by off-chip acoustic wave duplex filters (duplexers) which may typically consist of two band pass filters, e.g. implemented as Surface-Acoustic-Wave (SAW) filters which have a fixed operation frequency A drawback with duplexers is that they are typically expensive. They are also bulky which increases the size of a transceiver implementation. Duplexers are also fixed in frequency, which necessitates several duplexers to be used if several frequency bands are to be supported. These problems are becoming more pronounced as the number of frequency bands to be supported by a communication device is increased.

Therefore, there is a need for multi-band (preferably at least partly integrated) solutions that provide isolation between a transmitter and a receiver.

A typical on-chip isolation implementation is based on cancellation of the interferer signal. To achieve perfect cancellation of transmit signals at the receiver input, symmetry is necessary. For this purpose, such solutions typically comprises balancing with a dummy load that equals the antenna impedance both at the receive frequency and at the transmit frequency. Typically, balancing may provide good isolation between transmitter and receiver. Further, a balancing approach may be able to provide a desired function over a large number of frequency bands.

However, if the antenna impedance is complex (inductive or capacitive) and/or varies over time (e.g. due to frequency changes and/or changing antenna surroundings), implementation of a perfect cancellation becomes cumbersome, e.g. since the dummy load must track the antenna impedance at both receive frequency and transmit frequency simultaneously. Furthermore, in solutions using a dummy load, approximately 3 dB of the power will be lost.

"An on-chip wideband and low-loss duplexer for 3G/4G CMOS radios", by M. Mikehemar, et al., 2010 IEEE Symposium on VLSI Circuits (VLSIC), pp. 129-130 discloses a narrowband autotransformer duplexer with a balancing network (comprising a variable resistor in parallel with a variable capacitor) to cancel transmitter current at receiver input.

"A Tunable Integrated Duplexer with 50 dB Isolation in 40 nm CMOS", by M. Mikehemar, et al., 2009 IEEE International Solid-State Circuits Conference (ISSCC), pp. 386-387 discloses the center tap of an autotransformer connected to an antenna, and the RX and TX connected to the two sides of the autotransformer. A balancing resistor is connected between the TX and RX.

US 2010/0035563 A1 discloses an RF transceiver front-end that includes a balancing circuit and a multiple node isolation and coupling circuit. The multiple node isolation and coupling circuit includes an auto-transformer and two optional capacitors (each coupled in parallel with a respective winding of the auto-transformer). The antenna is coupled to the common node of the auto-transformer windings, the receiver section is coupled to a first node of one of the windings and the transmitter section is coupled to a node of the other winding. The balancing circuit is coupled to the receiver section and the transmitter section and includes a resistor and a variable capacitor in parallel with each other.

US 2011/0064004 A1 discloses a radio frequency (RF) front-end comprising a power amplifier (PA), a noise-matched low-noise amplifier (LNA), a balance network, and a four-port isolation module. The isolation module isolates the third port from the fourth port to prevent strong outbound signals received at the third port from saturating the LNA coupled to the fourth port. Isolation is achieved via electrical balance.

Similarly as described above, a drawback common to all of these solutions is that the balancing network needs to track impedance changes in the antenna during operation to enable sufficient isolation. The impedance needs to be tracked at both receive frequency and transmit frequency simultaneously. Thus, the implementation is sensitive and complex.

A drawback of these solutions is that they suffer from a high insertion loss, i.e. approximately 3 dB of the power of receive and transmit signals will be lost due to the matched impedance (in particular the balancing resistor) of the balance network. Consequences of the increased loss include that the receiver noise figure (NF) is degraded and that the transmitter power consumption is increased.

The bandwidth of the balancing network solutions may also be limited, which may cause problems when the transceiver front-end is intended to handle a wide range of frequencies.

Therefore, there is a need for alternative and improved (preferably at least partly integrated) multi-band solutions that provide isolation between a transmitter and a receiver.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved, or at least alternative, solutions that provide isolation between a transmitter and a receiver.

According to a first aspect, this is achieved by a transceiver front-end for a communication device. The transceiver front-end is connectable at a signal transmission and reception arrangement node to a signal transmission and reception arrangement adapted to transmit a transmit signal having a transmit frequency and to receive a receive signal having a receive frequency. The transceiver front-end is also connectable at a transmitter node to a transmitter adapted to produce the transmit signal, and at a receiver node to a receiver adapted to process the receive signal.

The transceiver front-end comprises a transformer, wherein the transmitter node is connected to a first node of a first side of the transformer, the receiver node is connected to a first node of a second side of the transformer, and the signal transmission and reception arrangement node is connected to a second node of the first side of the transformer and to a second node of the second side of the transformer.

The transceiver front-end also comprises a first tunable capacitance connected between the transmitter node and the receiver node, and a second tunable capacitance connected between the signal transmission and reception arrangement node and a signal reference level.

The signal reference level may be a signal ground level according to some embodiments.

In various embodiments, the first and second capacitances may each comprise one or more capacitors.

According to some embodiments, the first tunable capacitance may be adapted to pass a transmit frequency current that matches a transmit frequency leakage current through the second side of the transformer.

One possible definition of the transmit frequency current through the first tunable capacitance matching the transmit frequency leakage current through the second side of the transformer may be that the transmit frequency current through the first tunable capacitance in a direction from the transmitter node to the receiver node is equal (or substantially equal) in magnitude and opposite (or substantially opposite) in phase compared to the transmit frequency leakage current through the second side of the transformer in a direction from the signal transmission and reception node to the receiver node. Thus, if the first and second currents according to this definition were added or merged, one current would (at least substantially) cancel the other. That a first phase is substantially opposite to a second phase may, for example, be defined as the absolute difference between the first and second phases falling within the interval[$0.8\pi$; $1.2\pi$]. That a first magnitude is substantially equal to a second magnitude may, for example, be defined as the absolute difference between the first and second magnitudes (normalized by the second magnitude) falling within the interval of [0; 0.2].

The second tunable capacitance may be adapted to provide matching of an impedance of the signal transmission and reception arrangement in some embodiments. For example, the second tunable capacitance may be adapted to present a resistive impedance to the transmitter node. According to some embodiments, the second tunable capacitance may be adapted to present a 50 ohm impedance to the transmitter node.

In some embodiments, the first and second sides of the transformer are in-phase.

The first tunable capacitance may also, according to some embodiments, be adapted to pass a receive frequency current that matches a receive frequency leakage current through the second side of the transformer. The definition above regarding two currents matching each other may be applied also in this context.

In some embodiments, the transformer, the first tunable capacitance and the second tunable capacitance may be viewed as forming a first tunable impedance between the transmitter node and the receiver node, where the first impedance has a first phase at the receive frequency. In such embodiments, the transceiver front-end may further comprise a second tunable impedance connected between the transmitter node and the receiver node and adapted to have a second phase at the receive frequency, wherein the second phase is substantially opposite to the first phase. According to some embodiments, the second phase may be an opposite phase to the first phase.

In some embodiments, the transformer, the first tunable capacitance and the second tunable capacitance may be viewed as forming a first tunable impedance between the transmitter node and the receiver node, where the first impedance has a first phase at the transmit frequency. In such embodiments, the transceiver front-end may further comprise a second tunable impedance connected between the transmitter node and the receiver node and adapted to have a second phase at the transmit frequency, wherein the second phase is substantially opposite to the first phase. According to some embodiments, the second phase may be an opposite phase to the first phase.

The transceiver front-end may, in some embodiments, consist of the transformer, the first tunable capacitance and the second tunable capacitance.

A second aspect is a transceiver comprising the transceiver front-end of the first aspect and further comprising the transmitter and the receiver. According to some embodiments, the transceiver may further comprise the signal transmission and reception arrangement.

A third aspect is a communication device comprising the transceiver of the second aspect.

A fourth aspect is a method of minimizing a transmit signal component at a receiver node of a transceiver front-end of a communication device. The transceiver front-end is connectable at a signal transmission and reception arrangement node to a signal transmission and reception arrangement adapted to transmit the transmit signal having a transmit frequency and to receive a receive signal having a receive frequency, at a transmitter node to a transmitter adapted to produce the transmit signal, and at the receiver node to a receiver adapted to process the receive signal.

The method comprises connecting the transmitter node to a first node of a first side of a transformer, the receiver node to a first node of a second side of the transformer, and the signal transmission and reception arrangement node to a second node of the first side of the transformer and to a second node of the second side of the transformer.

Furthermore, the method comprises connecting a first tunable capacitance between the transmitter node and the receiver node, and connecting a second tunable capacitance between the signal transmission and reception arrangement node and a signal reference level.

The transmit signal component to be minimized at the receiver node of the transceiver front-end by the method may, for example, be one or more of a transmit frequency signal component and a receive frequency signal component. The transmit signal to be minimized may typically be a signal produced by the transmitter (at the transmit frequency as a desired signal and at the receive frequency as an unwanted interference signal) and leaked via the transformer to the receiver node.

In some embodiments, the second, third and fourth aspects may additionally have features identical with or corresponding to any of the various features as explained above for the first aspect.

An advantage of some embodiments is that a possibility to implement an (at least partly) integrated solution for isolation between a transmitter and a receiver is provided. An isolation construction is provided that may be easily implemented on-chip.

Another advantage of some embodiments is that power loss due to a dummy load is avoided. Naturally, an implementation using real (and thus non-ideal) components according to some embodiments may experience some power loss in one or more of the components (for example, due to limited Q-value of the transformer and/or capacitors). However, power loss due to a an intentionally lossy component (such as a dummy load) is avoided in some embodiments.

A further advantage with some embodiments is that matching to the antenna impedance is simplified. In the simplest case, there is only one capacitance (the second capacitance) that need to be tuned for antenna impedance matching.

Some embodiments provide solutions for isolation between a transmitter and a receiver that are simple and area efficient (e.g. one transformer and two capacitances).

The isolation solutions provided by some embodiments are easily tunable due to the small amount of tuning parameters (e.g. only two capacitances according to some embodiments).

Some embodiments provide for the possibility to cover a wide range of transmit and receive frequencies with a single (or very few) transceiver front-end arrangement(s).

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where transceiver structures are provided comprising a receiver, a transmitter, a signal transmission and reception arrangement (e.g. an antenna), and a transceiver front-end. The transceiver front-end of the embodiments is connectable to the signal transmission and reception arrangement, the transmitter and the receiver. Each of the respective connection interfaces may, for example, be single ended (comprising one connection node) or differential (comprising two connection nodes).

The transmitter is adapted to produce a transmit signal having a transmit frequency. The transmit signal is intended for transmission by the signal transmission and reception arrangement. The receiver is adapted to process a receive signal received by the signal transmission and reception arrangement and having a receive frequency. Even though the transmit signal is intended for the signal transmission and reception arrangement, part of the transmit frequency may leak to the receiver. It is desired to eliminate or at least minimize this leakage. Furthermore, the transmitter may also produce an unwanted signal component at a receive frequency. It is also desired to minimize appearance of this signal component at the signal transmission and reception arrangement as well as at the receiver.

Figure 1:
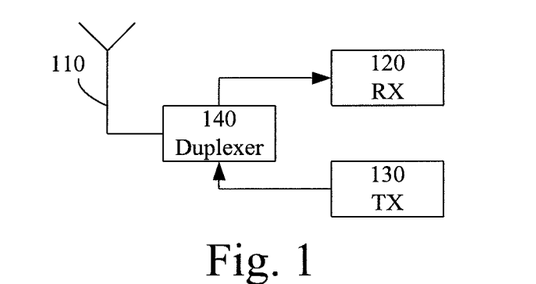
FIG. 1 is a schematic drawing illustrating a prior art transceiver arrangement.

FIG. 1 illustrates a typical transceiver arrangement according to the prior art. The typical transceiver comprises a receiver (RX) 120, a transmitter (TX) 130, an antenna 110 and a duplexer 140 implemented as a separate module. The duplexer provides the desirable isolation between the transmitter and the receiver. As mentioned before, some disadvantages of such a duplexer implementation is that it is typically expensive and large, and several instances of the duplexer filters may be necessary to cover various frequency ranges.

Embodiments described herein provide a different implementation of the desired isolation in the form of a tunable lumped isolator. The transceiver front-end of the embodiments comprises a transceiver and first and second capacitances. Isolation at the transmit frequency is achieved by generation in the transformer of a cancellation signal and cancelation of any remaining transmit frequency signal leakage through the transformer by a coupling capacitance. A second capacitance provides sufficient matching from the antenna to the isolation circuit. Thus, the transceiver front-end does not require any balancing resistance.

Figure 2:
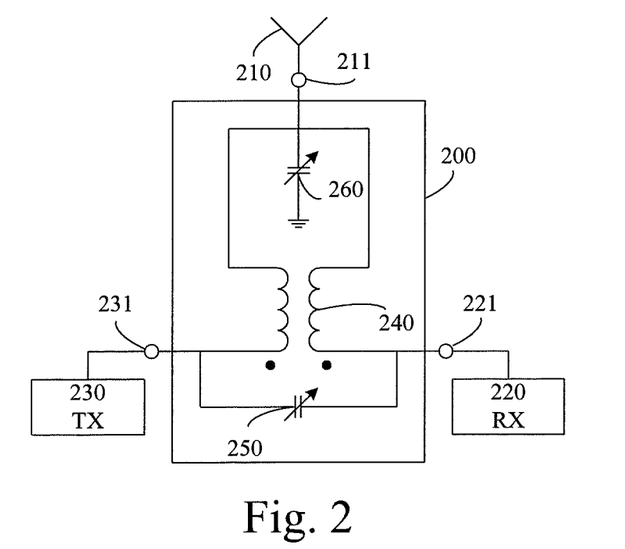
FIG. 2 is a schematic drawing illustrating an example transceiver arrangement according to some embodiments.

FIG. 2 illustrates an example transceiver arrangement including a transceiver front-end 200 according to some embodiments. This example transceiver arrangement comprises a receiver (RX, for example represented by a low noise amplifier, LNA) 220, a transmitter (TX, for example represented by a power amplifier, PA) 230, a signal transmission and reception arrangement 210, and a transceiver front-end 200. In an analysis of the function of the transceiver front-end, the transmitter may be viewed as a voltage source in series with a transmitter impedance which is also connected to the transmitter node, and the receiver may be viewed as a receiver impedance connected between the receiver node and signal ground.

The transceiver front-end 200 is connectable to the signal transmission and reception arrangement 210 at a signal transmission and reception arrangement node 211. The transceiver front-end 200 is also connectable to the transmitter 230 at a transmitter node 231 and to the receiver 220 at a receiver node 221. Thus, this example transceiver comprises a single ended structure of the transmitter output, the receiver input and of the signal transmission and reception arrangement port.

The transceiver front-end 200 comprises a transformer 240 and two variable capacitances 250, 260.

The two windings (or sides) of the transformer 240 are in-phase and have a coupling factor. The first winding is connected to the transmitter node 231 and to the signal transmission and reception node 211 while the second winding is connected to the receiver node 221 and to the signal transmission and reception node 211.

When a signal current (primary current) flows through the first winding of the transformer, a secondary current is produced in the second winding of the transformer and vice versa. The secondary current has equal phase as the primary current and a magnitude that relates to the magnitude of the primary current in accordance with the coupling factor associated with the transformer.

Since the first and second sides of the transformer are both connected to the signal transmission and reception node the secondary current cancels (at least part of—depending on the coupling factor) a leakage of the primary current.

For example, a signal produced by the transmitter 230 and intended for transmission by the signal transmission and reception arrangement 210 is transferred from the transmitter node 231 to the signal transmission and reception arrangement node 211 as a current via the first side of the transformer 240. A possible leakage of this current from the signal transmission and reception arrangement node 211 to the receiver node 221 is counteracted by the secondary current produced in the second side of the transformer 240. Ideally, if the coupling factor is 1 and the phase matching of the two transformer windings is perfect, the cancellation should be complete. If, however, the coupling factor is less than 1 and/or if the phase matching is not perfect a remaining leakage current will flow through the second side of the transformer to the receiver node 221.

This example is applicable both to desired transmit frequency signals produced by the transmitter and to unwanted receive frequency signal components produced by the transmitter.

It may be beneficial to choose a coupling factor which is relatively low so that the transmitter output and/or the signal transmission and reception arrangement are not loaded too heavily. In some embodiments, the coupling factor is chosen to any value less than 1. Example values may comprise a value in the range [0.5, 0.9] or in the range [0.6, 0.8] such as, for example, a value of approximately 0.7.

The transceiver front-end 200 also comprises a first tunable capacitance 250 connected between the transmitter node 231 and the receiver node 221. One benefit with this capacitance is that it may be tuned to pass a current (from the transmitter node 231 to the receiver node 221) that matches the remaining leakage current flowing through the second side of the transformer to the receiver node. If the current through the first capacitance 250 (in the direction from transmitter node to receiver node) is of the same magnitude and opposite phase as the leakage current through the second side of the transformer (in the direction from transmission and reception arrangement node to receiver node), the leakage current will be completely cancelled and no signal from the transmitter node 231 will reach the receiver node 221. Thus, according to this balancing concept, the first tunable capacitance 250 is used to cancel the transmitter leakage experienced at the receiver node 221 (e.g. at a low noise amplifier (LNA) input of the receiver) by dividing the transmitter signal into one main signal (passing through the first side of the transformer to the signal transmission and reception arrangement node 211) and an auxiliary signal (passing through the first tunable capacitance 250) in order to cancel any leakage of the main signal experienced at the receiver node 221. As above, this principle is applicable for both desired transmit frequency signals and unwanted receive frequency signal components produced by the transmitter.

It may be noted that some rejection of receive frequency signal leakage from the signal transmission and reception arrangement to the transmitter may be provided by impedance mismatch between the signal transmission and reception arrangement and the transmitter output according to some embodiments. For instance, the transmitter output impedance may be 5 ohms and the signal transmission and reception arrangement may be 50 ohms, which may provide a reflection at the transmitter output of most of the signal energy.

A second tunable capacitance 260 is also comprised in the transceiver front-end 200. The second tunable capacitance 260 is connected between the signal transmission and reception arrangement node 211 and signal ground. A purpose of the second tunable capacitance 260 is to provide matching of the signal transmission and reception arrangement impedance.

For example, if the antenna impedance of an implementation is 50 ohm, the return loss of the isolator (i.e. the transceiver front-end 200) may be close to 0 dB if the second tunable capacitance 260 is not present. By application and appropriate tuning of the second tunable capacitance 260 the return loss of the isolator may be suppressed to between −8 dB and −10 dB. At transmit frequency, for example, it would be beneficial to adapt the value of the first and second tunable capacitances 250, 260 such that the transmitter 230 (e.g. a power amplifier (PA) output of the transmitter) experiences an overall nominal impedance of 50 ohm at the transmitter node 231 whereby the transmit insertion loss may be kept as low as possible.

According to some embodiments, matching to the signal transmission and reception arrangement may, in addition to the second capacitance, be achieved by adapting the transmitter and receiver impedances, which may both be nominally 50 ohm. Simulations have indicated that, at least in some situations, the isolation is independent of the transmitter impedance. Even in such situations, the transmitter impedance may affect the signal transmission and reception arrangement matching, which may be adjusted through careful design of the transformer. Furthermore, a transmitter impedance of less than 50 ohm may be applied to decrease the receiver path loss. In one example, a relation between $L_1$ and $L_2$ expressed as $L_1 \approx 0.9 \neq L_2$, where $L_1$ denotes the inductance of the first side of the transformer and $L_2$ denotes the inductance of the second side of the transformer, may present a reasonable trade-off between signal transmission and reception arrangement matching, transmitter to receiver isolation and insertion loss (for both RX and TX). By changing the ratio between $L_1$ and $L_2$, the insertion loss in the receive path can be reduced at the cost of increasing the loss in the transmit path.

The first and second capacitances 250, 260 may, for example, comprise capacitors with a limited Q-value. The first and second capacitances 250, 260 may each comprise one or several capacitors. For example, any of the capacitances 250, 260 may comprise a single variable capacitor, an array of switched capacitors (each possibly non-variable), a combination of a non-variable capacitor and an array of switched capacitors (each possibly non-variable).

According to one example, the tuning of the first tunable capacitance at transmit frequency may comprise coming as close as possible to the following expression:

$$f_{Tx} \cdot C_1 = \frac{(f_{Tx}(L_2 - M))(f_{Tx}C_2 R_A + 1) + (f_{Tx}(L_1 - M))(f_{Tx}^2 L_2 C_2 R_A + f_{Tx} L_2 + R_A)}{(f_{Tx}(L_1 - M))(f_{Tx}(L_2 - M)(f_{Tx}^2 M C_2 R_A + f_{Tx} M + R_A) + f_{Tx}(L_1 - M)(f_{Tx}^2 L_2 C_2 R_A + f_{Tx} L_2 + R_A))},$$

where $f_{Tx}$ denotes the transmit frequency, $C_1$ denotes the value of the first tunable capacitance, $C_2$ denotes the value of the second tunable capacitance, $R_A$ denotes the impedance of the signal transmission and reception arrangement, $L_1$ denotes the inductance of the first side of the transformer, $L_2$ denotes the inductance of the second side of the transformer, and $M=k\sqrt{L_1 L_2}$, where k denotes the coupling factor of the transformer.

In this example, it is assumed that the receiver node 221 is equal to a virtual ground node and that the current through the first tunable capacitance 250 completely matches the current through the second side of the transformer.

The above equation may also be applied for tuning of the first tunable capacitance at receive frequency if $f_{Tx}$ is replaced by $f_{Rx}$ which denotes the receive frequency.

To achieve sufficient cancelling at both transmit and receive frequency, the tuning of the first tunable capacitance may be carried out with regard to a frequency between the transmit and receive frequencies. This is particularly useful if the duplex distance is relatively small.

The tuning of the second tunable capacitance at receive frequency may comprise coming as close as possible to the following expression:

$$f_{Rx} \cdot C_2 = \frac{f_{Rx}^2 (L_2 - M) C_1 R_{Rx} + f_{Rx} C_1 R_{Rx} + R_{Rx} + 1}{f_{Rx}^2 ((L_1 - M)(L_2 - M) + M C_1 R_{Rx}) +} - \frac{1}{R_A}.$$

$$f_{Rx} L_1 \left( f_{Rx}^2 (L_2 - M) C_1 R_{Rx} + \frac{M}{L_1} + R_{Rx} \right)$$

In this example, it is assumed that the PA of the transmitter is a perfect voltage source.

To achieve sufficient cancelling at both transmit and receive frequency, the tuning of the second tunable capacitance may be carried out with regard to a frequency between the transmit and receive frequencies. This is particularly useful if the duplex distance is relatively small.

As has been mentioned before, one purpose of the second capacitance is to match the isolator to the signal transmission and reception arrangement. Another purpose of the second capacitance is to further frequency tune the isolator (i.e. in addition to the tuning of the first capacitance). As can be seen from the example formulas presented above, the optimal tuning values of the first and second capacitances ($C_1$ and $C_2$) may be dependent of each other according to some embodiments. To find the optimal (or an acceptable) values of the capacitances, the first and second capacitances may, for example, be tuned jointly or iteratively.

The transceiver front-end of FIG. 2 has been presented in a single-ended application. Generally, if a differential structure of the transmitter output, the receiver input and of the signal transmission and reception arrangement port is applicable according to some embodiments, the transceiver front-end may comprise dual instances of the isolation structure (one for each set of nodes). For example, a first instance of the isolation structure described in connection to FIG. 2 may be connected to a first signal transmission and reception arrangement node, a first transmitter node, and a first receiver node, while a second instance of the isolation structure described in connection to FIG. 2 may be connected to a second signal transmission and reception arrangement node, a second transmitter node, and a second receiver node.

Another situation where more than one instance of the isolation structure may be beneficial is when a single instantiation cannot cover the entire range of frequencies applicable for the transceiver front-end. This may, for example be the case if the frequency range is extremely wide, if the component choice (e.g. transformer characteristics) and/or the circuit implementation makes the isolation performance insufficient. Typically, embodiments provides the possibility to cover a wide range of transmit and receive frequencies with a single (or very few) transceiver front-end arrangement(s).

In example scenario, the inductances of the first and second side of the transformer are 2 nH and 2.2 nH respectively, with a Q-value of 40 and a self-resonance frequency of 8.5 GHz. The first and second capacitances have a Q-value of 60. The isolation from transmitter to receive may be varied by tuning of the first and second capacitances according to at least some of the tuning possibilities mentioned above in connection to FIG. 2. The peak isolation may be determined by the resolution of the capacitances (e.g. the number of bits), while the isolation bandwidth and/or the isolation at a duplex distance may be less dependent on the resolution of the capacitances. In this example, a suitable range for the second capacitance may be 500 fF to 2.4 pF and a suitable range for the first capacitance may be 3 pF to 10.5 pF.

In general, insertion loss may be decreased by increasing the Q values of the inductors (transformer) and/or of the capacitances, and/or by changing the transmitter impedance as mentioned before.

Example isolation design has been given for an optimum signal transmission and reception arrangement impedance of 50 ohm. When the signal transmission and reception arrangement impedance is mismatched (not a real 50Ω impedance), degradation in performance (e.g. isolation and insertion loss) may typically be experienced and it would be desirable to address these situations also. According to simulations with signal transmission and reception arrangement impedance mismatches from 40 ohm to 60 ohm, isolation may be achieved to a large extent if the first and second capacitances are retuned for the actual signal transmission and reception arrangement impedance.

To further decrease signal transmission and reception arrangement impedance mismatch, an additional impedance tuner may be applied between the signal transmission and reception arrangement and the isolator.

Figure 3:
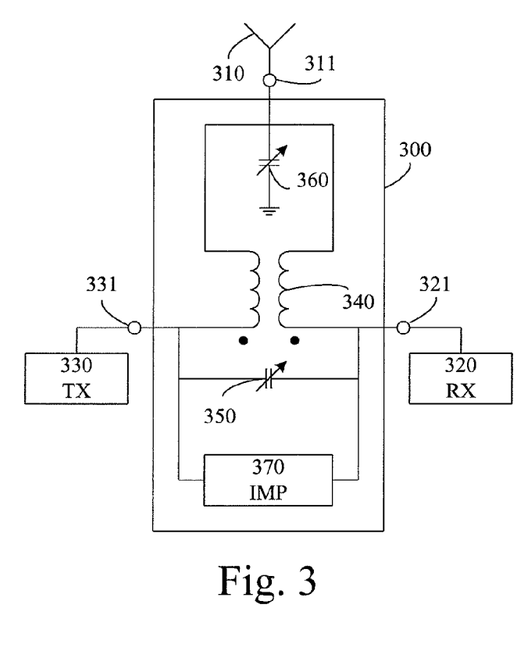
FIG. 3 is a schematic drawing illustrating an example transceiver arrangement according to some embodiments.

FIG. 3 illustrates an example transceiver arrangement including a transceiver front-end 300 according to some embodiments. In FIG. 3, the transmitter 330, the transmitter node 331, the receiver 320, the receiver node 321, the signal transmission and reception arrangement 310 and the signal transmission and reception arrangement node 311 are similar to the respective components 230, 231, 220, 221, 210 and 211 described in connection with FIG. 2 and will not be elaborated on further. Likewise, the transformer 340, the first capacitance 350 and the second capacitance 360 are similar to the respective components 240, 250 and 260 described in connection with FIG. 2.

The transceiver front-end 300, however, also comprises a tunable impedance 370 connected in parallel with the first capacitance 350 between the transmitter node 331 and the receiver node 321. Thus, an additional cancellation path is present in this embodiment. The impedance 370 may comprise any combination of capacitances, inductances and resistances. For example, the impedance 370 may be a series LC circuit or a phase shifter (e.g. a T-network).

A purpose of the impedance 370 may be to cancel any remaining signal leakage that the tuning of the first capacitance 350 is not able to prevent. For example, is the first capacitance is tuned to cancel optimally at transmit frequency or at a frequency between the transmit and the receive frequencies, the impedance 370 may be tuned to cancel the leakage at receive frequency. It may also be tuned to cancel any leakage at transmit frequency.

Thus, if the transformer, the first tunable capacitance and the second tunable capacitance are viewed as forming a tunable impedance between the transmitter node and the receiver node, where the first impedance leaks a current at the frequency in question (e.g. the receive or transmit frequency), the tunable impedance 370 may be adapted to pass a current at the frequency in question that cancels the leaked current. Thus, the current from transmitter node to receiver node through impedance 370 may optimally have opposite phase and equal magnitude as the leaked current.

The various tuning operations discussed in connection to FIGS. 2 and 3 may typically be carried out during use of the transceiver front-end, but may also (at least partly) be carried out in a design phase or a production phase of the transceiver front-end.

Figure 4:
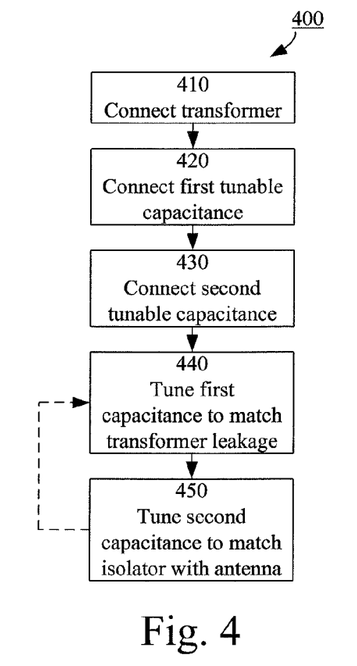
FIG. 4 is a flowchart illustrating example method steps according to some embodiments.

FIG. 4 is a flowchart illustrating an example method 400 for minimizing signal leakage from a transmitter node to a receiver node in a receiver front-end of a transceiver of a communication device according to some embodiments. Similarly as has been described in connection to FIGS. 2 and 3, the transceiver front-end is connectable at a signal transmission and reception arrangement node to a signal transmission and reception arrangement adapted to transmit a transmit signal having a transmit frequency and to receive a receive signal having a receive frequency, at a transmitter node to a transmitter adapted to produce the transmit signal, and at a receiver node to a receiver adapted to process the receive signal.

In 410, a transformer is connected to the respective nodes of the transceiver front-end. The transmitter node is connected to a first node of a first side of the transformer, the receiver node to a first node of a second side of the transformer, and the signal transmission and reception arrangement node to a second node of the first side of the transformer and to a second node of the second side of the transformer.

In 420 a first tunable capacitance is connected between the transmitter node and the receiver node, and in 430 a second tunable capacitance is connected between the signal transmission and reception arrangement node and a signal reference level.

The first and second capacitances are tuned in 440 and 450, for example as has been described in connection to any of FIGS. 2 and 3. The tuning may be iterative as indicated by the optional path from 450 to 440.

Other details of the method may be extracted from the transceiver embodiments described above.

A transceiver front-end may comprise a single structure according to the embodiments (e.g. any of the structures of FIGS. 2 and 3) or may comprise two or more of such structures (for example to be able to cover a wide range of frequencies and/or different relations between receive and transmit frequencies).

A transceiver front-end of embodiments may be comprised in a transceiver (also comprising a receiver, a transmitter and possibly a signal transmission and reception arrangement). A transceiver front-end or transceiver may in turn be comprised in a wireless communication device.

The described embodiments and their equivalents may be realized in hardware. They may be performed by specialized circuits such as for example application-specific integrated circuits (ASIC), by discrete components, or by a combination thereof. All such forms are contemplated to be within the scope of the invention.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a communicator, an electronic organizer, a smartphone, a computer, a notebook, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the limitations of the described embodiments are merely for illustrative purpose and by no means limiting. Instead, all variations that fall within the range of the claims are intended to be embraced therein.

The invention claimed is:

1. A transceiver front-end for a communication device, connectable:
    at a signal transmission and reception arrangement node to a signal transmission and reception arrangement adapted to transmit a transmit signal having a transmit frequency and to receive a receive signal having a receive frequency;
    at a transmitter node to a transmitter adapted to produce the transmit signal; and
    at a receiver node to a receiver adapted to process the receive signal;
    the transceiver front-end comprising:
    a transformer, wherein the transmitter node is connected to a first node of a first side of the transformer, the receiver node is connected to a first node of a second side of the transformer, and the signal transmission and reception arrangement node is connected to a second node of the first side of the transformer and to a second node of the second side of the transformer;
    a first tunable capacitance connected between the transmitter node and the receiver node and adapted to provide at least a cancelation signal from one node of the transmitter and receiver nodes to an other node of the transmitter and receiver nodes, wherein the cancelation signal cancels a leakage signal passing through one of the first and second sides of the transformer; and
    a second tunable capacitance connected between the signal transmission and reception arrangement node and a signal reference level.

2. The transceiver front-end of claim 1 wherein the first tunable capacitance is adapted to pass a transmit frequency current that matches a transmit frequency leakage current through the second side of the transformer.

3. The transceiver front-end of claim 1, wherein the second tunable capacitance is adapted to provide matching of an impedance of the signal transmission and reception arrangement.

4. The transceiver front-end of claim 3 wherein the second tunable capacitance is adapted to present a resistive impedance to the transmitter node.

5. The transceiver front-end of claim 1, wherein the first and second sides of the transformer are in-phase.

6. The transceiver front-end of claim 1, wherein the first tunable capacitance is adapted to pass a receive frequency current that matches a receive frequency leakage current through the second side of the transformer.

7. The transceiver front-end of claim 1, wherein the transformer, the first tunable capacitance and the second tunable capacitance form a first tunable impedance between the transmitter node and the receiver node, the first impedance having a first phase at the receive frequency, the transceiver front-end further comprising:
  a second tunable impedance connected between the transmitter node and the receiver node and adapted to have a second phase at the receive frequency, wherein the second phase is an opposite phase to the first phase.

8. The transceiver front-end of claim 1, wherein the transceiver front-end consists of the transformer, the first tunable capacitance and the second tunable capacitance.

9. A transceiver comprising the transceiver front-end of claim 1, and further comprising the transmitter and the receiver.

10. The transceiver of claim 9 further comprising the signal transmission and reception arrangement.

11. A communication device comprising the transceiver of claim 10.

12. A method of minimizing a transmit signal component at a receiver node of a transceiver front-end of a communication device, the transceiver front-end connectable:
  at a signal transmission and reception arrangement node to a signal transmission and reception arrangement adapted to transmit the transmit signal having a transmit frequency and to receive a receive signal having a receive frequency;
  at a transmitter node to a transmitter adapted to produce the transmit signal; and
  at the receiver node to a receiver adapted to process the receive signal;
the method comprising:
connecting the transmitter node to a first node of a first side of a transformer, the receiver node to a first node of a second side of the transformer, and the signal transmission and reception arrangement node to a second node of the first side of the transformer and to a second node of the second side of the transformer;
connecting a first tunable capacitance between the transmitter node and the receiver node, wherein the first tunable capacitance is adapted to provide at least a cancelation signal from one node of the transmitter and receiver nodes to an other node of the transmitter and receiver nodes, wherein the cancelation signal cancels a leakage signal passing through one of the first and second sides of the transformer; and
connecting a second tunable capacitance between the signal transmission and reception arrangement node and a signal reference level.

13. The method of claim 12 further comprising adapting the first tunable capacitance to pass a transmit frequency current that matches a transmit frequency leakage current through the second side of the transformer.

14. The method of claim 12, further comprising adapting the second tunable capacitance to provide matching of an impedance of the signal transmission and reception arrangement.

15. The method of claim 14, further comprising adapting the first tunable capacitance to pass a receive frequency current that matches a receive frequency leakage current through the first side of the transformer.

* * * * *